United States Patent
Goswami et al.

(10) Patent No.: US 7,424,716 B1
(45) Date of Patent: Sep. 9, 2008

(54) METHOD FOR TRACKING AN EVENT THROUGH MULTIPLE MODULE-SPECIFIC FILES

(75) Inventors: Deepangkar Goswami, Bangalore (IN); Balasubramanian Viswanathan, Bangalore (IN); Madan Mohan Vinjamuri, Bangalore (IN)

(73) Assignee: Cisco Technology, Inc., San Jose, CA (US)

( * ) Notice: Subject to any disclaimer, the term of this patent is extended or adjusted under 35 U.S.C. 154(b) by 793 days.

(21) Appl. No.: 10/198,946

(22) Filed: Jul. 18, 2002

(51) Int. Cl.
*G06F 3/00* (2006.01)
*G06F 9/46* (2006.01)

(52) U.S. Cl. ...................... 719/318; 718/106
(58) Field of Classification Search ................ 719/318, 719/310; 714/48; 718/106
See application file for complete search history.

(56) References Cited

U.S. PATENT DOCUMENTS

| | | | | |
|---|---|---|---|---|
| 5,754,855 | A * | 5/1998 | Miller et al. | 718/106 |
| 6,006,016 | A * | 12/1999 | Faigon et al. | 714/48 |
| 6,182,200 | B1 * | 1/2001 | Duvall et al. | 711/165 |
| 2002/0116661 | A1 * | 8/2002 | Thomas et al. | 714/17 |
| 2002/0196280 | A1 * | 12/2002 | Bassett et al. | 345/751 |
| 2003/0005021 | A1 * | 1/2003 | Shah et al. | 709/1 |

OTHER PUBLICATIONS

IBM Teach Disclosure Bulletin, Arithmetic Algorithm for Determing Computer, May 1977.*
CNET.com, "Working with Win2000 Event Viewer, Part I," http://windows.about.com/library/weekly/aa000625a.htm, printed Nov. 14, 2002, 10 pages.
CNET.com, "Working with Win2000 Event Viewer, Part II," http://windows.about.com/library/weekly/aa000702a.htm, printed Nov. 14, 2002, 7 pages.
Michael D. Reilly, "Windows NT Event Viewer," winnetmag.com/Articles/Index.cfm?ArticleID=3953, printed Nov. 14, 2002, 11 pages.

* cited by examiner

*Primary Examiner*—William Thomson
*Assistant Examiner*—LeChi Truong
(74) *Attorney, Agent, or Firm*—Hickman Palermo Truong & Becker LLP

(57) ABSTRACT

A method and apparatus for tracking data associated with an event across multiple files includes generating a particular value upon occurrence of a particular event during a first process spawned from a first module. The particular value is unique among all events during processes spawned from all modules. First data associated with the particular event is written to a first file of the multiple files. The first file records information associated with the first process according to the first module. The first data includes the particular value. Second data is sent to a second process spawned from a second module. The second data includes the particular value.

26 Claims, 5 Drawing Sheets

METHOD FOR TRACKING AN EVENT THROUGH MULTIPLE MODULE-SPECIFIC FILES

FIELD OF THE INVENTION

The present invention generally relates to using software applications that involve multiple modules of computer instructions. The invention relates more specifically to tracking one event through multiple files, each file written specifically for a process that executes instructions in one module.

BACKGROUND OF THE INVENTION

Computer programs are sets of instructions for controlling processors in computing devices. Computer programs are typically written in one or more high level languages that are easy for a human being to understand. These source language statements are then typically compiled by a special type of program called a compiler and converted to coded instructions, which often correspond to the actual operations performed by a processor in a computer device.

Frequently the coded instructions are not identical to the native instructions for the processor, but, instead, are instructions for a particular virtual machine. A virtual machine is a process that interprets coded instructions and executes them. The virtual machine itself is an executable sequence of instructions in the native language of the processor. Virtual machines are sometimes called interpreters. As used herein, the term "machines" includes virtual machines interpreting virtual machine instructions, operating systems interpreting operating system instructions, and processors executing native instructions.

In general, coded instructions from one or more modules can be linked to form an executable program. Modules can consist of source language statements, coded instructions for a particular virtual machine, runtime executables, or some combination of these, with or without associated data. Modules in a high-level source language may be compiled by a run time compiler to produce corresponding modules in coded instructions.

It is becoming more common to create programs that include heterogeneous modules. For example, a program may include a machine-executable module, a module executable by a first type of virtual machine, and a module executable by a second type of virtual machine. During execution of the program, a routine in the machine-executable module may call a routine in the module running in a first type of virtual machine, and that routine may call another routine in the module running in a second type of virtual machine.

In addition, it is common for programs executing on different processors to interact with each other. For example, an application program, such as a network management program, runs as a first process on one processor on one device on a network. While running, the first process may make a request of a device management server program (the "server"), a second process executing separately on a second device on the network, to provide management information about the second device. In turn, the second process may launch a local configuration program as a third process executing separately on the second device or invoke a user authentication program executing on a separate third device. The local configuration program determines properties of the local device by either getting the current status of the local device or changing the status or both. In many situations, the interacting programs will be written by different programmers in different organizations for different types of virtual machines on the different processors. For example, one will be a Java program, while the other is a C language program.

It is also typical for each process that runs to log certain events in a log file written specifically for that process. Logged events might include, for example, reaching certain milestones in the processing of data, encountering particular user actions, invoking separate processes, receiving results from separate processes, invocations by separate processes, returning results to separate processes, and encountering an error or interruption in processing. The log files are often important in determining what a process spawned from a module actually does when a particular user under particular circumstances executes the instructions in the module. Sometimes what a process does contrasts with what it was designed to do because of equipment failures, external problems, or because some circumstances were unanticipated by the programmers of the module. The log files help developers of each module determine the actual performance of processes spawned from the module. Typically, the log files are specific to a module; the events are identified and event properties are represented in ways specifically designed by the developers of the module.

A problem arises when it becomes useful to track an event across log files written by interacting processes spawned from separately developed modules, often executing on different processors. For example, an error encountered by the third process causes an error event to be entered in the log file for the third process along with data about the error of concern to developers of the third module, the local configuration program or the authentication agent program. The error is identified in the third log file by some error code, X, determined by the developers of the third module. The third process may then enter other information into the log file.

As a result of the error, the third process returns control to the calling process, the second process, with some indication of error. The error indication returned by the third process to the second process causes an error event to be entered in the log file for the second process along with data about the error of concern to developers of the second module, the device management server. The error is identified in the second log file by some error code, Y, determined by the developers of the device management server and may be unrelated to X, the code that identifies the error in the third log file. The second process may then enter other information into the second log file.

As a result of the error, the second process returns control to the calling process, the first process, with some indication of error. The error indication returned by the second process to the first process causes an error event to be entered in the log file for the first process along with data about the error of concern to developers of the first module, the network management program. The error is identified in the first log file by some error code, Z, determined by the developers of the network management program and may be unrelated to the way the error is identified in the second log file.

A user of the first process will find it difficult to retrieve information about the error event stored in the log file for the third process. The error identification, X, used in the third log file is unknown to the user of the first process.

One approach that could be pursued is to require each current process to pass the error identification in the current process, determined by the developers of the module for the current process, to the calling process that called the current process. In addition, the current process stores the error code returned from a called process in the log file along with the error identification. For example, the second process stores the value X along with the value Y in the second log file; and passes the value Y to the first process. Then, the first process stores the value Y along with the value Z in the first log file. A user of the first process can retrieve information about the error event stored in the third log file by tracking backwards through the second log file. For example, the user finds in the first log file that the error Z is associated with the error Y; then searches the second log file to find that the error Y is associated with the error X; then searches the third log file to find the error X and the information about the error X.

One problem with this approach is that a user must track the error through all the log files of the intervening processes. Another problem with this approach is that the error codes may not be unique. For example, the error code X might appear several times in the third log file, every time the third process encounters the same problem; or, the error code Y might appear several times in the second log file; or both error codes might appear several times in their respective log files. There might not be sufficient information to determine which error identification is associated with the event of interest to the user.

Another approach that could be pursued is to require each current process to identify an error in the current process by the error identification returned from a called process, to use the same error identification in the log file, and to pass the same error identification to the calling process. For example, the second process stores the value X in the second log file, and passes the value X to the first process. Then, the first process stores the value X in the first log file. A user of the first process can retrieve information about the error event stored in the third log file by going directly to the third log file. For example, the user finds in the first log file that the error identification is X; then searches the third log file to find the error X and the information about the error X. The user does not have to search the log files of all the intervening processes.

One problem that remains with this approach is that the error codes may not be unique. For example, the error code X might appear several times in the third log file, every time the third process encounters the same problem. There might not be sufficient information in the third log file to determine which error identification is associated with the event of interest to the user.

Based on the foregoing, there is a clear need for a tracking one event through multiple files, each file written specifically for a process that executes instructions in one module.

The past approaches described in this section could be pursued, but are not necessarily approaches that have been previously conceived or pursued. Therefore, unless otherwise indicated herein, the approaches described in this section are not admitted to be prior art to the claims in this application merely by inclusion in this section.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION OF THE PREFERRED EMBODIMENT

Figure 1:
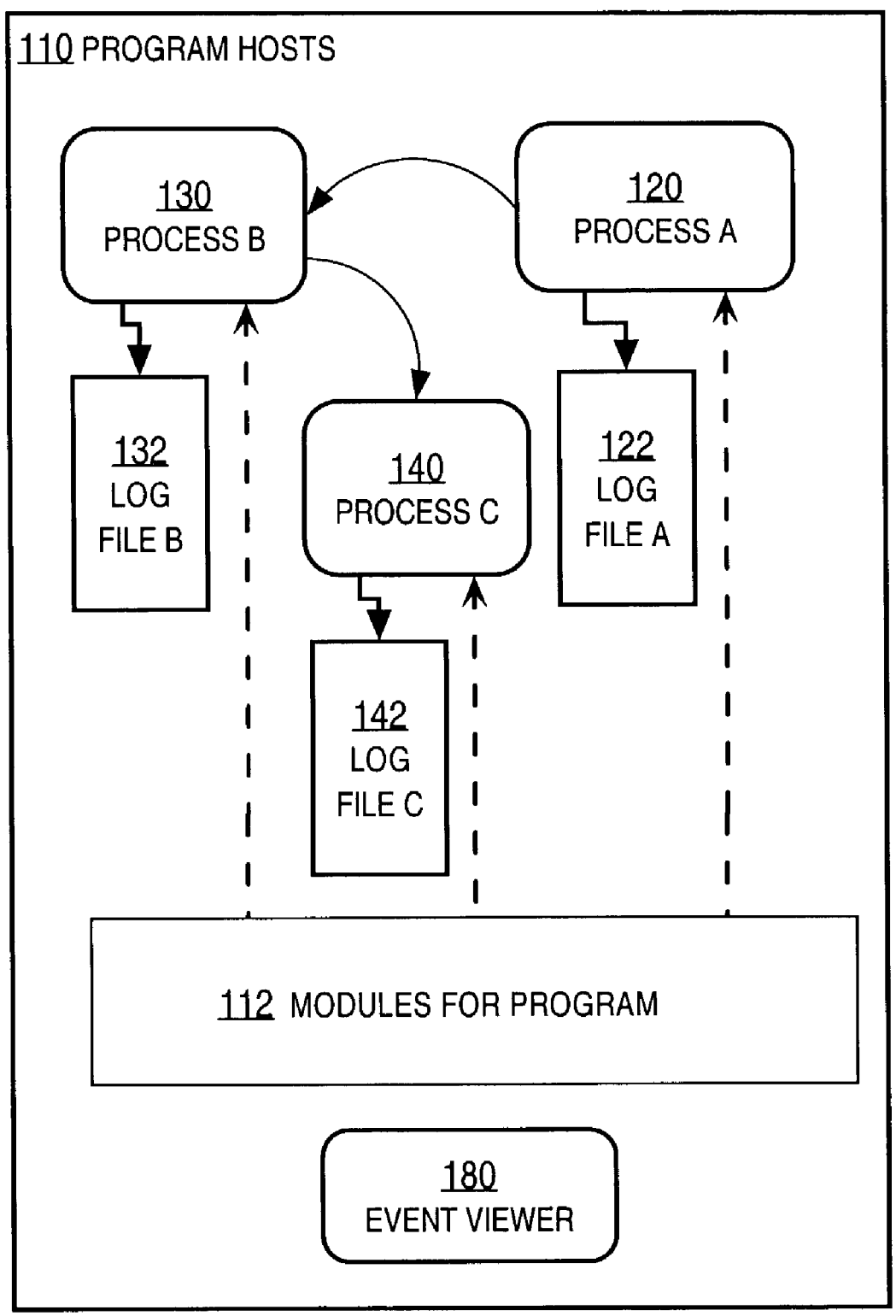
FIG. 1 is a block diagram that illustrates multiple files written by multiple processes spawned by multiple modules for a computer application, according to an embodiment.

A method and apparatus are described for tracking one event through multiple files written specifically for different processes based on different modules. In the following description, for the purposes of explanation, numerous specific details are set forth in order to provide a thorough understanding of the present invention. It will be apparent, however, to one skilled in the art that the present invention may be practiced without these specific details. In other instances, well-known structures and devices are shown in block diagram form in order to avoid unnecessarily obscuring the present invention.

Embodiments are described herein according to the following outline:

| | |
|---|---|
| 1.0 | General Overview |
| 2.0 | Structural and Functional Overview |
| | 2.1 Structural Overview |
| | 2.2 Functional Overview |
| 3.0 | Method of Tracking Events |
| | 3.1 Process of Writing Log Files |
| | 3.2 Process of Viewing Event Data |
| 4.0 | Implementation Mechanisms—Hardware Overview |
| 5.0 | Extensions and Alternatives |

1.0 General Overview

The needs identified in the foregoing Background, and other needs and objects that will become apparent for the following description, are achieved in the present invention, which comprises, in one aspect, a method for tracking data associated with an event across multiple files. Each file is written specifically for a process that executes instructions in one module of multiple modules of computer instructions. Upon occurrence of a particular event during a first process spawned from a first module, a particular value is generated that is unique among all events during processes spawned from all modules. First data associated with the particular event is written to a first file of the multiple files. The first file stores information associated with the first process according to the first module. The first data includes the particular value. Second data is sent to a second process spawned from a second module. The second data includes the particular value.

According to another aspect, a method includes receiving first data from a first process that executes computer instructions in a first module of multiple modules. The first data is received at a second process that executes computer instructions in a second module. The first data includes a particular value that is unique among all events during processes spawned from all modules of the multiple modules. The particular value is included in a first file of the multiple files. The first file is associated with the first process. Second data associated with receiving the first data is written to a second file. The second file is different from the first file. The second file stores information associated with the second process according to the second module. The second data includes the particular value. Third data is sent to a third process that executes computer instructions in a third module. The third data includes the particular value.

According to another aspect, a method includes reading first data from a first file that stores information associated with a first process. The first process executes computer instructions in a first module of multiple modules. The first data is recorded according to instructions in the first module and includes a particular value that uniquely identifies a particular event among all events during execution of all of the multiple modules. Second data is read from a second file of the plurality of files. The second file is different from the first file, and stores information associated with the second process according to the second module. It is determined whether the second data includes the particular value. If so, then a particular portion of the second data associated with the particular value is presented to a user interested in the particular event.

In other aspects, the invention encompasses a computer apparatus and a computer readable medium, including a carrier wave, configured to carry out the foregoing steps.

According to another aspect, a computer-readable medium for tracking data associated with an event across multiple files comprises a first file. Each file is written specifically for a process that executes instructions in one module of multiple modules of computer instructions. The first file stores information associated with a first process that executes computer instructions in a first module of the multiple modules. The first file includes a particular value that uniquely identifies a particular event among all events during execution of all processes for all modules among the multiple modules.

Embodiments based on one or more of these aspects allow a user to track a single event among multiple log files written for multiple processes spawned by multiple modules.

Embodiments are described in the following sections in the context of error events written to log files by separate processes based on different modules developed in different languages by different developers, which modules are invoked directly or indirectly by a particular application. However, the invention is not limited to this context. Other embodiments include other events recorded in multiple files written by multiple processes. For example, some embodiments include tracking an event affecting multiple web pages written by different web servers that execute on one or more different host machines connected to a network.

2.0 Structural and Functional Overview

To illustrate tracking an event across multiple log files, it is assumed that an application program begins when a user launches Process A, which interacts with Process B, which interacts with Process C. Each of the processes writes a log file to record information about the progress of its processing. In other embodiments, each process may interact with more or fewer processes.

2.1 Structural Overview

FIG. 1 is a block diagram that illustrates an example of multiple files written by multiple processes spawned by multiple modules for a computer application, according to an embodiment. Multiple modules 112 are stored on one or more program hosts 110 connected by a network (not shown). Each program host is a computing device of a computer system as described below in Section 4.0 with reference to FIG. 5. Executing on the one or more hosts 110 are three processes 120, 130, 140, also termed Process A, Process B, Process C, respectively, based on instructions stored in modules 112. Dashed arrows indicate that each process 120, 130, 140 executes instructions from one of the modules 112; e.g., the processes are spawned from the modules 112. Each process 120, 130, 140 may execute on the same host where its module is stored or on a different host of the one or more program hosts 110.

Each process 120, 130, 140 writes a log file 122, 132, 142, respectively, to record its progress, as indicated by the solid arrows with straight segments. The data written to the log files may include indications of one or more various events, such as reaching certain milestones in the processing of data, encountering particular user actions, invoking separate processes, receiving results from separate processes, invocation by separate processes, returning results to separate processes, and encountering an error or interruption in processing.

The curved arrows indicate that process 120 (Process A), the main process of the application program, invokes process 130 (Process B) which invokes process 140 (Process C).

Executing on the one or more hosts 110 is an event viewer process ("event viewer") 180, according to some embodiments. The event viewer process is described in more detail in a later section with reference to FIG. 4.

For purposes of illustrating a simple example, FIG. 1 shows only three processes and three log files. However, embodiments are not limited to this example, and a practical system may have two or any number greater than two of processes and log files.

Figure 2:
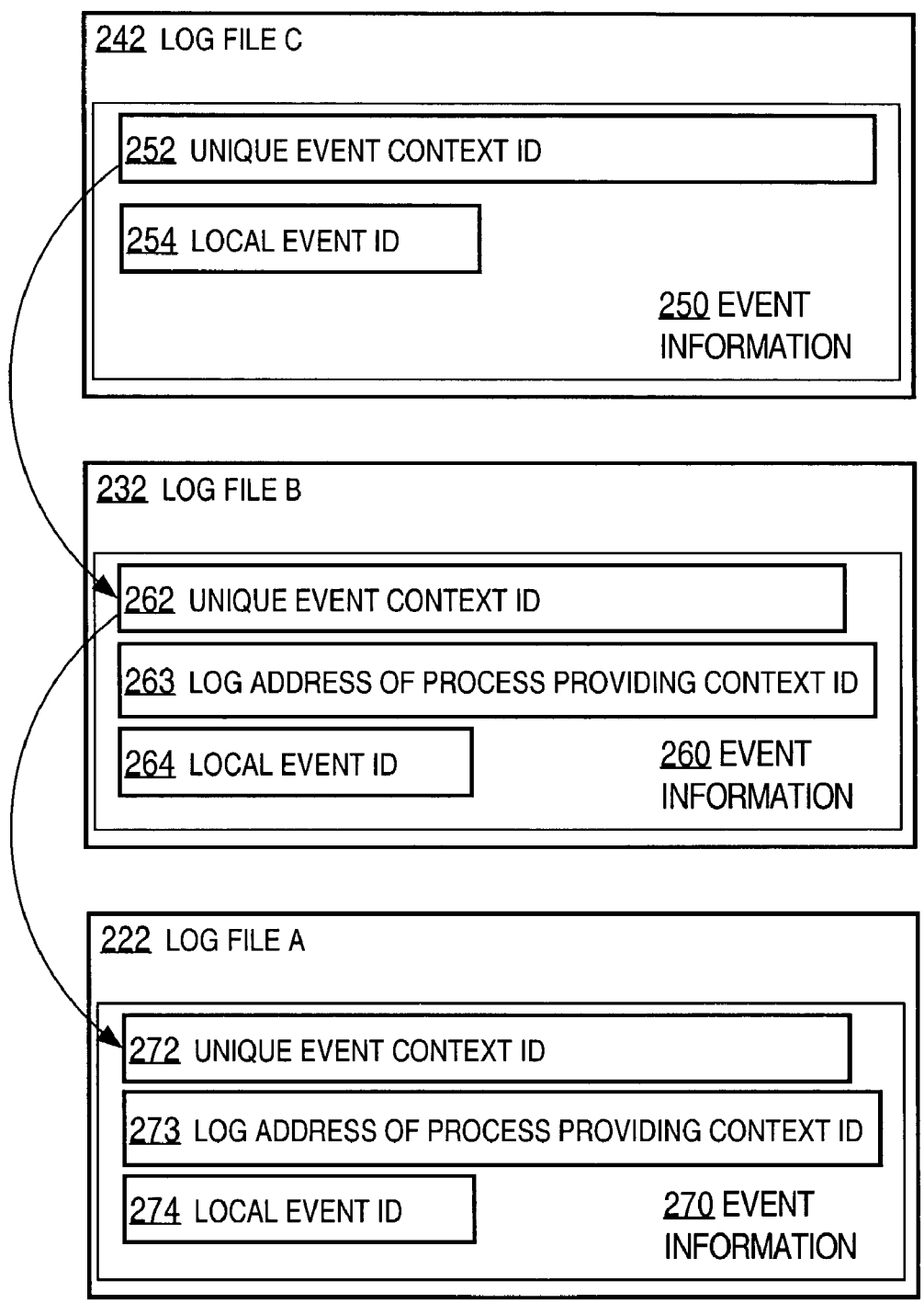
FIG. 2 is a block diagram that illustrates event information stored in multiple log files, according to an embodiment.

FIG. 2 is a block diagram that illustrates event information 250, 260, 270 stored in multiple log files 242, 232, 222, respectively, according to an embodiment. Log files 242, 232, 222 correspond to log files 142, 132, 122, respectively, of FIG. 1. As in conventional log files, the event information 250, 260, 270 includes an event identification field established for the individual process ("local event ID") fields 254, 264, 274, respectively. For example, the local event ID field 254 for an error encountered by process 140 (Process C) contains an error number X indicating a particular type of error associated with Process C; while the local event ID field 264 for an error encountered by process 130 (Process B) contains an error number Y indicating a particular type of error associated with Process B; and, the local event ID field 274 for an error encountered by process 120 (Process A) has an error number Z indicating a particular type of error associated with Process A.

According to the illustrated embodiments, the event information 250, 260, 270 in each log file includes event context identification ("event context ID") fields 252, 262, 272. A value for the event context ID field is unique for each event among all events for all the processes spawned from all the modules used by the application program. Event information associated with the same event is given the same value of the event context ID in the log file of every process involved in the program. For example, if the values are identical in context ID fields 252, 262, 272, then the event information 250, 260, 270 is all associated with the same event.

In some embodiments, one or more of the event information 250, 260, 270 includes an address of a log file of a different process involved with the event. For example, event information 260 for Process B includes an address 263 for the log file 242 of Process C. Similarly, event information 270 for Process A includes an address 273 for the log file 232 of Process B.

2.2 Functional Overview

In order to have the same value in the event context IDs 252, 262, 272, the value of the event context ID passes from Process C, which writes Log File 242, to Process B, which invokes Process C and which writes Log File 232, to Process A, which invokes Process B and which writes Log File 222. Such passing of the value is indicated in FIG. 2 by a curved arrow connecting event context ID field 252 to event context ID field 262 and a curved arrow connecting event context ID field 262 to event context ID field 272. The passing of the value is described in more detail below with reference to FIG. 3.

In some embodiments, the process writing the event information 250, 260, 270 records an address of a log file of a different process that passes the context ID to the process that writes the event information. For example, event information 260 for Process B includes an address 263 for the log file 242 of Process C that provides the context ID to Process B. Similarly, event information 270 for Process A includes an address 273 for the log file 232 of Process B that provides the context ID to Process A In order to ensure that the values in two event context ID fields are the same only if they are associated with the same event, the value is generated to be unique for each event. For purpose of illustrating an example, the unique value may be generated by concatenating a date and time when the event is detected, with a name of the module whose instructions are executed by the process that detects the event, and with an identification of the device on which is executing the process that detects the event. A unique identification for a device suitable for use in the event context ID is the media access control (MAC) address value assigned to every device that can be connected to a network. The illustrated embodiment exploits the expectation that at any one time, only one process is executing on a particular device.

It is assumed for purposes of illustration, that Process C executes instructions in a module called "Module-C" and is executing on a device with a MAC address of MAC-C. It is further assumed that an error event is detected by Process C at 3 AM on Jan. 3, 2001. According to an illustrated embodiment, a value for the event context ID field is generated by concatenating data such as "2001:1:3:03:00:00.000000: Module-C:MAC-C." The data can be expressed with other representations in other embodiments. For example, the date could be expressed in days since midnight on New Year's Eve and the time could be expressed in number of microseconds since midnight on the current day, or a universal epoch value (such as the UNIX epoch value) can be used. The data can be combined in a different order in other embodiments. For example, the module name could occur first, followed by the date, which is followed by the MAC address, which is followed by the time.

In other embodiments other means of generating a unique value are employed. For example, if a device has multiple processors, then a processor ID is included in the event context ID. In some embodiments, the value of the event context ID is generated by applying a hash function to the date-time, module name, and MAC address, so that the value is expressed in a given number of bits of data regardless of the number of characters in the name of the module or MAC address.

3.0 Method of Tracking Events

An illustrated embodiment of a method for tracking events across multiple log files is described below with reference to flowcharts in FIG. 3 and FIG. 4. Although steps of the flowcharts are depicted in a particular order in the illustrated embodiments, in other embodiments the steps can be performed in a different order or overlapping in time.

3.1 Process of Writing Log Files

Figure 3:
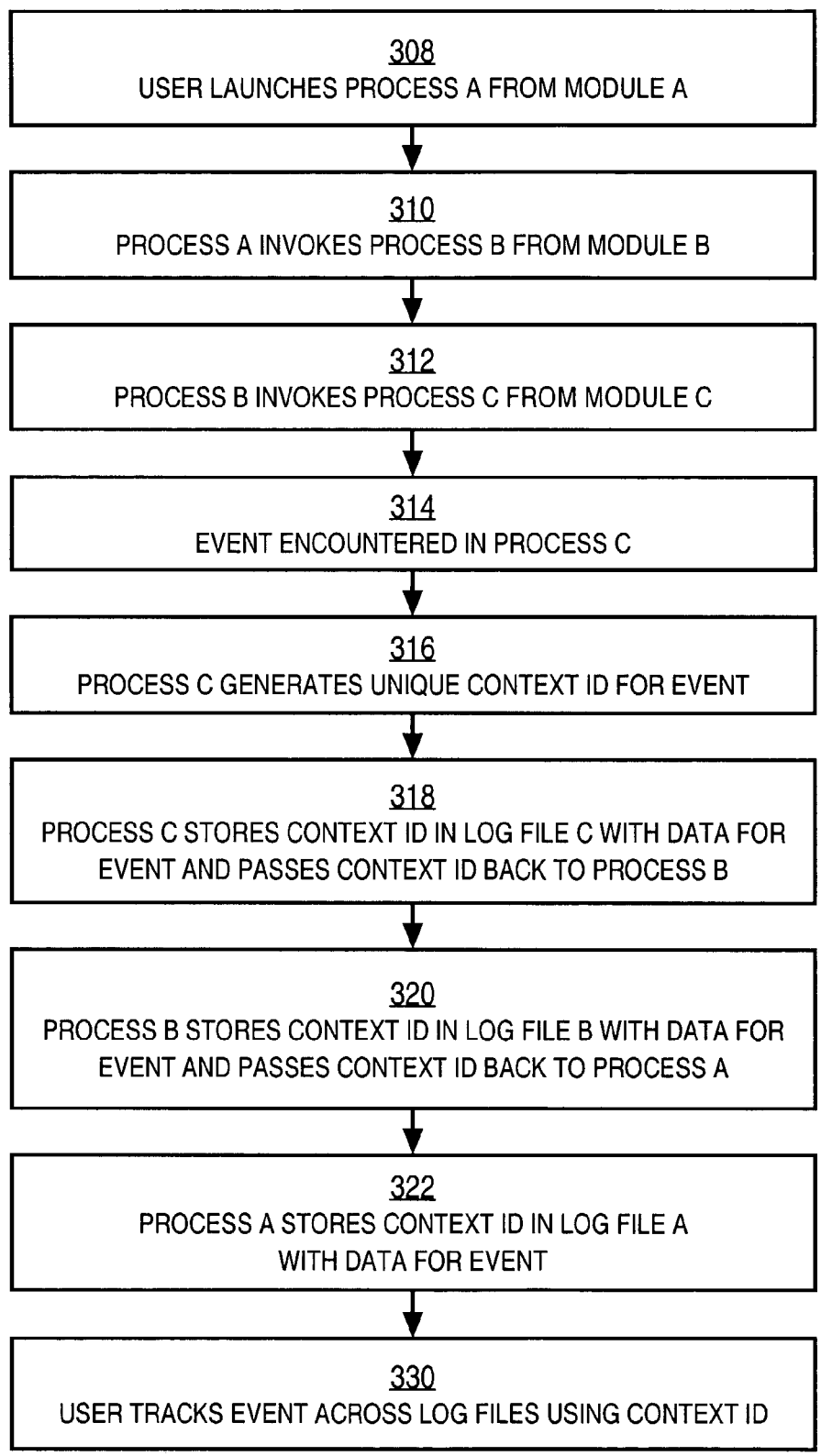
FIG. 3 is a flowchart that illustrates a high level overview of one embodiment of a method for tracking events across multiple log files.

FIG. 3 is a flowchart that illustrates a high level overview of one embodiment 300 of a method for tracking events across multiple log files. For purposes of illustrating a simple example, FIG. 3 addresses operations performed by only three processes and three log files. However, embodiments are not limited to this example, and a practical system involves operations performed by two or any number greater than two of processes and log files.

In step 308 the user launches Process A from Module-A. For example, process 120 is launched from Module A among the modules 112, as indicated by the broken arrow in FIG. 1, in response to commands by a user. For purposes of illustration, it is assumed that Module A contains instructions in the C programming language to manage multiple devices on a network. Process 120 writes data to log file 222 to record the progress of its processing.

In step 310, Process A invokes Process B from Module-B. The invocation can be performed in any manner known when the embodiment is implemented. For example, the invocation can take the form of a procedure call that causes Process B to be launched from Module-B with parameters values sent according to an application programming interface (API), or a remote procedure call that causes Process B to be launched from Module-B on a separate host according to the remote procedure API. In other embodiments, the invocation can take the form of sending a message to Process B that is already running, such as a server process. For example, process 130 is launched from Module-B among the modules 112, as indicated by the broken arrow, to respond to requests from other processes. For purposes of illustration, it is assumed that Module B contains instructions in the C programming language for a network management server that manages a particular network device. Process 130 writes data to log file 232 to record the progress of its processing.

In step 312, Process B invokes Process C from Module-C. The invocation can be performed in any manner known when the embodiment is implemented. For example, process 140 is launched from Module-C among the modules 112, as indicated by the broken arrow, to respond to requests from other processes. For purposes of illustration, it is assumed that Module C contains instructions in the Java programming language for an authentication agent program that prompts a user to enter a user identification ("User ID") and a password. Process 140 writes data to log file 242 to record the progress of its processing.

In step 314, Process C encounters an event. In the illustrated example, Process C encounters an error event associated with authentication failure. For example, a user has failed to enter a proper user ID and password combination within a certain amount of time or number of tries. It is assumed for purposes of illustration that such a failure is designated by error number X101 according to the developers of Module-C.

In step 316, Process C generates a unique value for the context ID for the event. For example, Process C generates the value "2001:1:3:03:00:00.000000:Module-C:MAC-C," described above.

In step 318, Process C records the value of the context ID in the context ID field of Log File 242 along with other data for the event. For example, Process C stores in event information 250 the value "2001:1:3:03:00:00.000000:Module-C: MAC-C" in the context ID field 252 of the Log File 242 along with other data associated with the event. For example, Process C stores the error number "X101" in the local event ID field 254. For purposes of illustration, it is assumed that the other information associated with the event that is stored in the event information 250 includes data indicating the number of attempts made, the IDs and passwords used, and the amount of time waited after each prompt for a response from the user. For example, it is assumed that the user made two attempts with the same ID and two different passwords but did not respond to a third prompt in a maximum time allotted for a response, such as two minutes; and, it is assumed that this information is stored in the event information 250 outside the context ID field 252 and the local event ID field 254.

Because Process C did not receive the context ID from another process that sent a log file address, no log file address is written in event information 250. In some embodiments a default log address is written to event information 250, which indicates that no other process or log file is involved in the event. For example a blank field, a zero, or the URL address of Log File C itself is written to the event information 250.

Also during step 318, Process C passes the value of the context ID to Process B that invoked Process C. Any manner known in the art can be used to pass this data. For example, the value can be passed in a parameter of the API used to invoke Process C in some embodiments. In some embodiments, the value can be written to a file shared by the two processes. In some embodiments, the value is passed in a message sent from Process C to Process B. In the illustrated embodiment, the value "2001:1:3:03:00:00.000000:Module-C:MAC-C" for the context ID is passed in an error message from Process C to Process B.

In some embodiments, during step 318, Process C also passes a network address for its log file, Log File 242. For example, the Universal Resource Location (URL) of the log file is passed back to the calling module. For purposes of illustration, it is assumed that the Log File 242 has a URL of "domainC.com/directoryC/Logfiles/file242" and that Process C passes this URL as the network address for the Log File 242.

In response to receiving the error message from Process C, Process B responds to the error. For purposes of illustration, it is assumed that Process B, a network management server, generates an error number Y222 that indicates to the developers of the B Module that an attempt to modify properties of a device failed. The error does not indicate whether this failure is due to a failure to authenticate the user, or due to a hardware problem with the device, or due to an illegal request being received from Process A, or due to some other cause.

In step 320, Process B records the value of the context ID in the context ID field of Log File 232 along with other data for the event. For example, Process B stores in event information 260 the value "2001:1:3:03:00:00.000000:Module-C:MAC-C" in the context ID field 262 of the Log File 232 along with other data associated with the event. For example, Process B stores the error number "Y222" in the local event ID field 264. For purposes of illustration, it is assumed that the other information associated with the event that is stored in the event information 260 includes data indicating the device whose properties were to be modified and the current settings for properties of that device. For example, it is assumed that the device to be modified has MAC address "MAC-B" and has a list, "List-B," of values for properties that describe the current state of the device; and, it is assumed that this information is stored in the event information 260 outside the context ID field 262 and the local event ID field 264. In some embodiments, Process B also records the address of the log file passed back from Process C. For example, Process B stores the value "domainC.com/directoryC/Logfiles/file242" in the event information 260 of Log File 232.

Also during step 320, Process B passes the value of the context ID to Process A that invoked Process B. Any manner known in the art can be used to pass this data. In the illustrated embodiment, the value "2001:1:3:03:00:00.000000:Module-C:MAC-C" for the context ID is passed in an error message from Process B to Process A.

In some embodiments, during step 320, Process B also passes a network address for its log file, Log File 232. For purposes of illustration, it is assumed that the log file has a URL of "domainB.com/directoryB/Logfiles/file232" and that Process B passes this URL as the network address for the Log File 232.

In response to receiving the error message from Process B, Process A responds to the error. For purposes of illustration, it is assumed that Process A, a network management program, generates an error number Z321 that indicates to the developers of the A Module that an attempt to modify properties of a device failed. The error does not indicate whether this failure is due to a failure to authenticate the user, or due to a hardware problem with the device, or due to an illegal request being sent by Process A, or due to some other cause.

In step 322, Process A stores the value of the context ID in the context ID field of Log File 222 along with other data for the event. For example, Process A stores in event information 270 the value "2001:1:3:03:00:00.000000:Module-C:MAC-C" in the context ID field 272 of the Log File 222 along with other data associated with the event. For example, Process A stores the error number "Z321" in the local event ID field 274. For purposes of illustration, it is assumed that the other information associated with the event that is stored in the event information 270 includes data indicating the device whose properties were to be modified and the new settings for properties of that device that were requested when Process B was invoked by Process A. For example, it is assumed that the device to be modified has MAC address "MAC-B" and that a list, "List-A," contains values for properties that describe the requested state for the device; and, it is assumed that this information is stored in the event information 270 outside the context ID field 272 and the local event ID field 274. In some embodiments, Process A also records the address of the log file passed back from Process B. For example, Process A stores the value "domainB.com/directoryB/Logfiles/file232" in the event information 270 of Log File 222.

In step 330 a user tracks an event leading to error Z321 across log files using the values in the context ID field. An embodiment of step 330 is described in more detail below with reference to FIG. 4.

3.2 Process of Viewing Event Data

Figure 4:
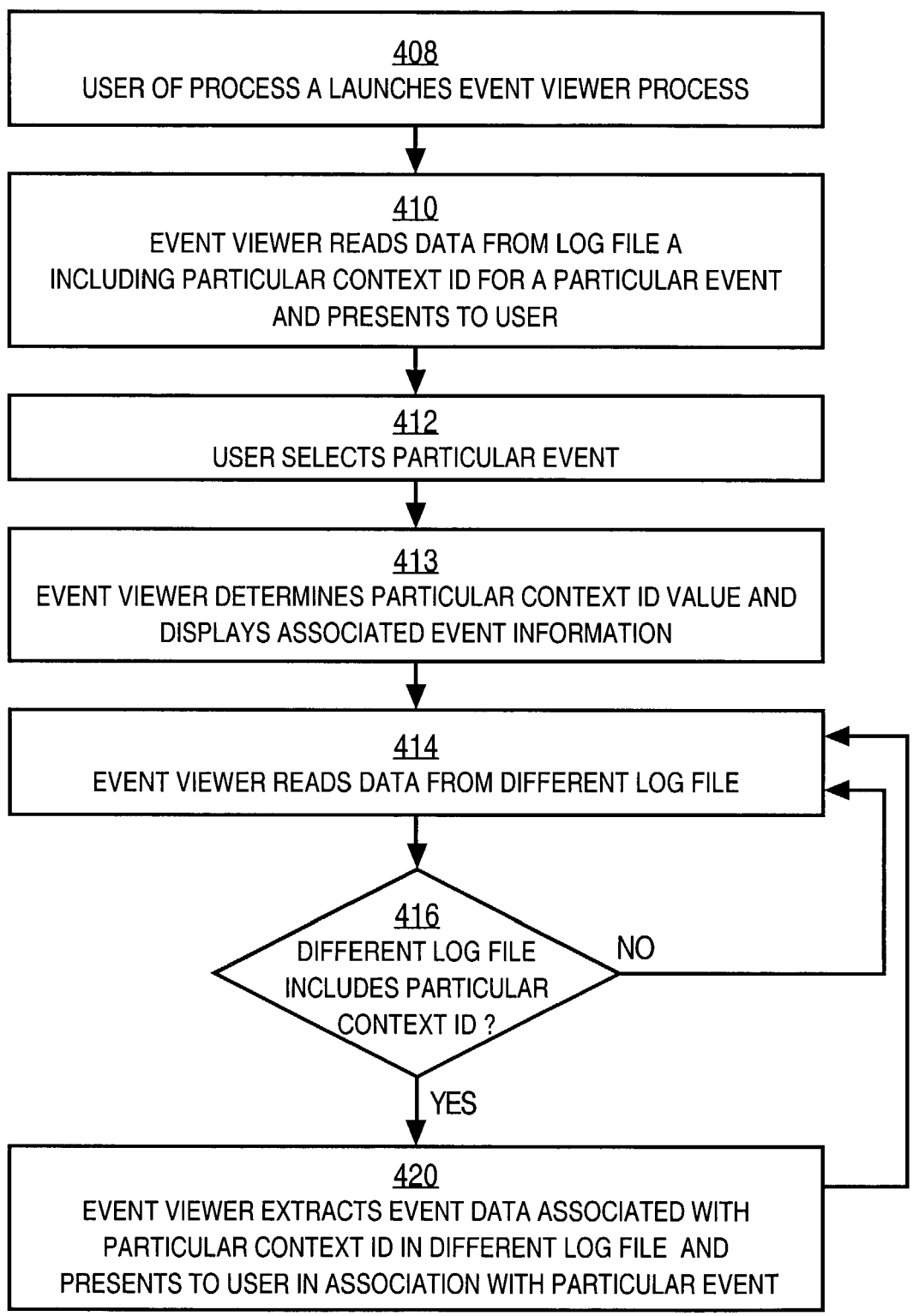
FIG. 4 is a flowchart that illustrates an embodiment of a step for tracking events across multiple log files.

FIG. 4 is a flowchart that illustrates an embodiment 330a of step 330 for tracking events across multiple log files. It is assumed for purposes of illustration that before steps of embodiment 330a are initiated other actions were taken by the network management program, Process A, and by the network management server, Process B, and by the authentication agent program, Process C that has led to other events occurring and data describing the other events to be entered into each log file corresponding to the three processes, both before and after the data described in the preceding section.

With a conventional system, when a user tries to determine what led to a particular occurrence of error Z321 in Process A, the user would have to examine a large amount of data in log files 222, 232, 242 and reason through which entries are associated with receiving error Z321, as described in the Background section. It may be impossible to determine which event information in Log file 242 is associated with a particular occurrence of error Z321 in Log file 222. According to the illustrated embodiment, the user only need determine from Log File 222 that the event has the context ID of "2001:1:3:03:00:00.000000:Module-C:MAC-C" and then find that same value in one of the other log files, e.g., Log File 242 to find additional information associated with the same event.

In step 408, a user launches an event viewer process 180. In other embodiments, the viewer process 180 may already be executing on one or more of the hosts 110, and the user merely sends a message indicating a desire to view data associated with events. Step 408 includes indicating the process with which the events are associated. For example, the user indicates that events associated with the network management program, Process A, are of interest.

In step 410, the event viewer reads data from the log file for the indicated process. For example, the event viewer reads data for Process A from the Log File 222 and presents some or all of the information from the log file to the user. For example, the event viewer displays a list of events associated with Process A, including multiple occurrences of error number Z321.

In step 412, the user selects one of the events to view. For purposes of illustration, it is assumed that the user selects the occurrence of error number Z321 that was generated as described in the preceding section. The event information for this event is stored in event information 270 in Log File 222.

In step 413, in response to the user's selection, the event viewer 180 determines the event information associated with the user's selection. For example, the event viewer 180 determines that the event information for the selected event is stored in event information 270 in Log File 222. The event viewer 180 then determines that the event of interest has the particular value of the event context ID "2001:1:3:03:00:00.000000:Module-C:MAC-C" that is stored in the event context ID field 272 of event information 270. The event viewer 180 then displays some of the event information 270 for the user to view. For example, the event viewer 180 displays information indicating the selected error Z321 is associated with an attempt to reset the properties of device MAC-B to the values given in List-A. In some embodiments the contents of the event context ID are also displayed; but, for purposes of illustration, it is assumed that the particular value of the event context ID is not displayed to the user.

In step 414, the event viewer 180 reads data from a different log file. Any method for selecting the different log file may be used. In some embodiments, every log file is examined in either a preset order or in an arbitrary order. In other embodiments, the log file to read is determined based on the process called immediately before the event of interest in the original log file. For example, if Log File 222 for Process A records that Process A sent a message to Process B just before the selected error Z321 occurred, then the event viewer would select the log file of Process B to read next. In some embodiments, the event viewer selects the log file having the network address passed by the called process and recorded in the event information of the current log file. For example, Log File 222 of Process A records the URL "domainB.com/directoryB/Logfiles/file232" of Log File 232 of Process B in the event information 270 along with the event context ID "2001:1:3:03:00:00.000000:Module-C:MAC-C." In this embodiment, the viewer would next read data from log file 232 of Process B. Such embodiments offer the advantage that not all log files have to be searched for the particular value of the context ID, only those log files associated with that particular event. In some embodiments, the user indicates the log file to read. For example, if the user suspects the selected error is due to a problem encountered in Process C, the user can direct the event viewer to next examine Log File C. For purposes of illustration it is assumed that the different log file is Log File 242 for Process C.

In step 416, the event viewer 180 determines whether the different log file just read includes event information with the particular value of the event context ID in the event context ID field. For example, the event viewer determines that Log file C includes event information 250 with the value "2001:1:3:03:00:00.000000:Module-C:MAC-C" in the event context ID field 252.

If it is determined in step 416 that the different log file does not include the particular value, control passes back to step 414 to read the data from a different log file, if any. Nothing from the current, different log file is displayed in association with the particular event.

If it is determined in step 416 that the different log file does include the particular value, control passes to step 420. In step 420, the event viewer 180 determines the event information associated with the particular event based on the particular value of the event context ID. For example, the event viewer 180 determines that the event information for the selected event is stored in event information 250 in Log File 242 for Process C. The event viewer 180 then displays some of the event information 250 for the user to view. For example, the event viewer 180 displays information indicating the selected error Z321 is associated with error X101 during an unsuccessful attempt to authenticate a user. The event viewer may even indicate the value of the user ID entered, and the two invalid values for passwords entered in the first two tries, and the amount of time the Process C waited for responses, including the maximum amount of time waited for a third response that never came. In some embodiments the contents of the event context ID are also displayed; but, for purposes of illustration, it is assumed that the event context ID is not displayed to the user.

According to the illustrated embodiment, the user easily finds information associated with a particular event in any of several log files written specifically for processes of different modules. The user need not view all log files associated with the event. or even read all log files of intervening processes associated with the event.

In some embodiments that read all log files or that determine what files to read based on entries in other log files, the Log File B 232 is also read during one iteration of step 416. In such embodiments, it is determined in step 416 that the Log File B does include the particular value, and control passes to step 420. In step 420, the event viewer 180 determines that the event information for the selected event is stored in event information 260 in Log File 232 for Process B. The event viewer 180 then displays some of the event information 260 for the user to view. For example, the event viewer 180 displays information indicating the selected error Z321 is associated with error Y222 during an unsuccessful attempt to reset a device. The event viewer may even indicate the device, MAC-B, being reset and the list, "List-B," of the current setting for that device at the time of the error. In some embodiments, the viewer determines the URL of the next log file to read based on the value "domainC.com/directoryC/Logfiles/file242" stored in log file address 263 of event information 260. In some embodiments the contents of the event context ID are also displayed.

4.0 Implementation Mechanisms—Hardware Overview

Figure 5:
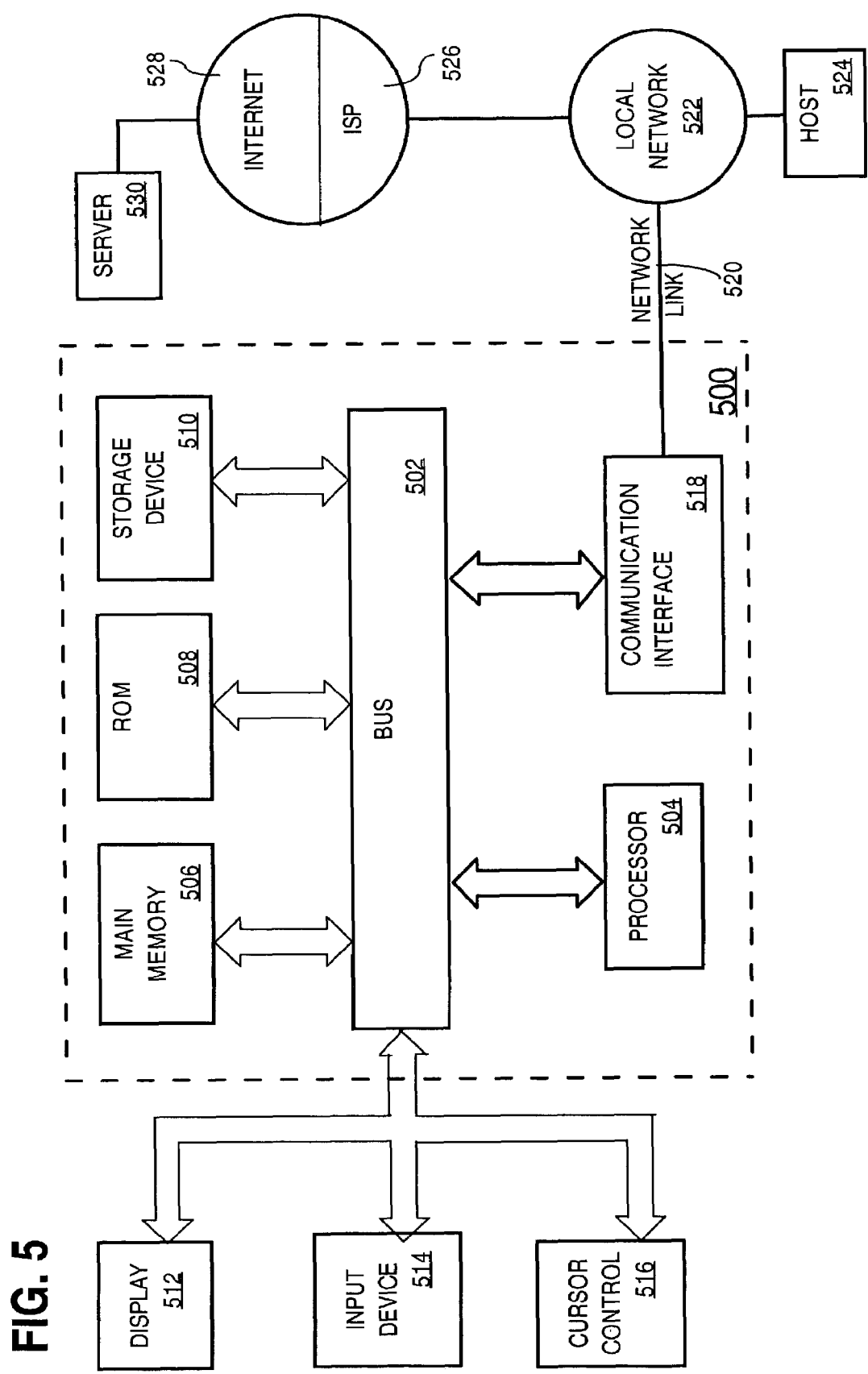
FIG. 5 is a block diagram that illustrates a computer system upon which an embodiment may be implemented.

FIG. 5 is a block diagram that illustrates a computer system 500 upon which an embodiment of the invention may be implemented. Computer system 500 includes a bus 502 or other communication mechanism for communicating information, and a processor 504 coupled with bus 502 for processing information. Computer system 500 also includes a main memory 506, such as a random access memory (RAM) or other dynamic storage device, coupled to bus 502 for storing information and instructions to be executed by processor 504. Main memory 506 also may be used for storing temporary variables or other intermediate information during execution of instructions to be executed by processor 504. Computer system 500 further includes a read only memory (ROM) 508 or other static storage device coupled to bus 502 for storing static information and instructions for processor 504. A storage device 510, such as a magnetic disk or optical disk, is provided and coupled to bus 502 for storing information and instructions.

Computer system 500 may be coupled via bus 502 to a display 512, such as a cathode ray tube (CRT), for displaying information to a computer user. An input device 514, including alphanumeric and other keys, is coupled to bus 502 for communicating information and command selections to processor 504. Another type of user input device is cursor control 516, such as a mouse, a trackball, or cursor direction keys for communicating direction information and command selections to processor 504 and for controlling cursor movement on display 512. This input device typically has two degrees of freedom in two axes, a first axis (e.g., x) and a second axis (e.g., y), that allows the device to specify positions in a plane.

The invention is related to the use of computer system 500 for implementing the techniques described herein. According to one embodiment of the invention, those techniques are performed by computer system 500 in response to processor 504 executing one or more sequences of one or more instructions contained in main memory 506. Such instructions may be read into main memory 506 from another computer-readable medium, such as storage device 510. Execution of the sequences of instructions contained in main memory 506 causes processor 504 to perform the process steps described herein. In alternative embodiments, hard-wired circuitry may be used in place of or in combination with software instructions to implement the invention. Thus, embodiments of the invention are not limited to any specific combination of hardware circuitry and software.

The term "computer-readable medium" as used herein refers to any medium that participates in providing instructions to processor 504 for execution. Such a medium may take many forms, including but not limited to, non-volatile media, volatile media, and transmission media. Non-volatile media includes, for example, optical or magnetic disks, such as storage device 510. Volatile media includes dynamic memory, such as main memory 506. Transmission media includes coaxial cables, copper wire and fiber optics, including the wires that comprise bus 502. Transmission media can also take the form of acoustic or light waves, such as those generated during radiowave and infra-red data communications.

Common forms of computer-readable media include, for example, a floppy disk, a flexible disk, hard disk, magnetic tape, or any other magnetic medium, a CD-ROM, any other optical medium, punch cards, paper tape, any other physical medium with patterns of holes, a RAM, a PROM, and EPROM, a FLASH-EPROM, any other memory chip or cartridge, a carrier wave as described hereinafter, or any other medium from which a computer can read.

Various forms of computer readable media may be involved in carrying one or more sequences of one or more instructions to processor 504 for execution. For example, the instructions may initially be carried on a magnetic disk of a remote computer. The remote computer can load the instructions into its dynamic memory and send the instructions over a telephone line using a modem. A modem local to computer system 500 can receive the data on the telephone line and use an infrared transmitter to convert the data to an infra-red signal. An infrared detector can receive the data carried in the infra-red signal and appropriate circuitry can place the data on bus 502. Bus 502 carries the data to main memory 506, from which processor 504 retrieves and executes the instructions. The instructions received by main memory 506 may optionally be stored on storage device 510 either before or after execution by processor 504.

Computer system 500 also includes a communication interface 518 coupled to bus 502. Communication interface 518 provides a two-way data communication coupling to a network link 520 that is connected to a local network 522. For example, communication interface 518 may be an integrated services digital network (ISDN) card or a modem to provide a data communication connection to a corresponding type of telephone line. As another example, communication interface 518 may be a local area network (LAN) card to provide a data communication connection to a compatible LAN. Wireless links may also be implemented. In any such implementation, communication interface 518 sends and receives electrical, electromagnetic or optical signals that carry digital data streams representing various types of information.

Network link 520 typically provides data communication through one or more networks to other data devices. For example, network link 520 may provide a connection through local network 522 to a host computer 524 or to data equipment operated by an Internet Service Provider (ISP) 526. ISP 526 in turn provides data communication services through the worldwide packet data communication network now commonly referred to as the "Internet" 528. Local network 522 and Internet 528 both use electrical, electromagnetic or optical signals that carry digital data streams. The signals through the various networks and the signals on network link 520 and through communication interface 518, which carry the digital data to and from computer system 500, are exemplary forms of carrier waves transporting the information.

Computer system 500 can send messages and receive data, including program code, through the network(s), network link 520 and communication interface 518. In the Internet example, a server 530 might transmit a requested code for an application program through Internet 528, ISP 526, local network 522 and communication interface 518.

The received code may be executed by processor 504 as it is received, and/or stored in storage device 510, or other non-volatile storage for later execution. In this manner, computer system 500 may obtain application code in the form of a carrier wave.

5.0 Extensions and Alternatives

In the foregoing specification, the invention has been described with reference to specific embodiments thereof. It will, however, be evident that various modifications and changes may be made thereto without departing from the broader spirit and scope of the invention. The specification and drawings are, accordingly, to be regarded in an illustrative rather than a restrictive sense.

What is claimed is:

1. A computer-implemented method for tracking data associated with an event across a plurality of files, each file written specifically for a process that executes instructions in one module of a plurality of modules of computer instructions, comprising the steps of:

generating, upon occurrence of a particular event during a first process that executes computer instructions in a first module of the plurality of modules, a non-integer based particular value that uniquely identifies each occurrence of the event among a plurality of occurrences of events during processes spawned from all modules among the plurality of modules;

storing first data associated with the particular event to a first file of the plurality of files, wherein the first file stores information associated with the first process according to the first module and the first data includes the particular value; and sending second data to a second process that executes computer instructions in a second module of the plurality of modules, the second data including the particular value;

including at least, within the non-integer based particular value, data based on an identification for a device on which the first process executes;

outputting in a human cognizable format at least one of the plurality of files such that continuity of the particular event may be tracked by a user through the plurality of files based on the particular value; and, wherein the storing comprises storing in a tangible computer-readable medium;

wherein the sending comprises sending the second data over a data network;

wherein said step of generating the particular value further comprises including, in the particular value, data based on a time of the event.

2. The method as recited in claim 1, wherein the second process caused the first process to be executed.

3. The method as recited in claim 1, wherein said step of generating the particular value further comprises including, in the particular value, data based on an identification for the first process.

4. The method as recited in claim 1, wherein said step of generating the particular value further comprises including, in the particular value, data based on an identification for a device on which the first process executes.

5. The method as recited in claim 1, wherein the plurality of modules includes instructions in a plurality of languages.

6. The method as recited in claim 1, wherein the particular event comprises at least one of reaching a certain milestone while processing data, encountering a particular user action, invoking a separate process, receiving a result from a separate process, being invoked by a separate process, returning a result to a separate process, and encountering an error or interruption in processing.

7. The method as recited in claim 1, wherein at least some information in the first data is not in the second data.

8. A computer-implemented method for tracking data associated with an event across a plurality of files, each file written specifically for a process that executes instructions in one module of a plurality of modules of computer instructions, comprising the steps of:

receiving first data, from a first process that executes computer instructions in a first module of the plurality of modules, at a second process that executes computer instructions in a second module of the plurality of modules, wherein the first data includes a non-integer based particular value that uniquely identifies each occurrence of the event among a plurality of occurrences of events during execution of all modules among the plurality of modules, and the particular value is included in a first file of the plurality of files, the first file associated with the first process;

storing second data associated with receiving the first data to a second file of the plurality of files, the second file different from the first file, wherein the second file records information associated with the second process according to the second module and the second data includes the particular value; and sending third data to a third process that executes computer instructions in a third module of the plurality of modules, the third data including the particular value;

including at least, within the non-integer based particular value, data based on an identification for a device on which the first process executes;

outputting in a human cognizable format at least one of the plurality of files such that continuity of the particular event may be tracked by a user through the plurality of files based on the particular value;

wherein the storing comprises storing in a tangible computer-readable medium, wherein the sending comprises sending the third data over a data network;

wherein said step of generating the particular value further comprises including, in the particular value, data based on a time of the event.

9. The method as recited in claim 8, wherein the second process caused the first process to be executed.

10. The method as recited in claim 8, wherein the third process caused the second process to be executed.

11. The method as recited in claim 8, wherein the particular value further comprises data based on a time of the event.

12. The method as recited in claim 8, wherein the particular value further comprises data based on identification for the first module.

13. The method as recited in claim 8, wherein the particular value further comprises data based on identification for a device on which the first process executes.

14. The method as recited in claim 8, wherein the plurality of modules includes instructions in a plurality of languages.

15. The method as recited in claim 8, wherein the particular event comprises at least one of reaching a certain milestone while processing data, encountering a particular user action, invoking a separate process, receiving a result from a separate process, being invoked by a separate process, returning a result to a separate process, and encountering an error or interruption in processing.

16. The method as recited in claim 8, wherein at least some information in the first file is not in the second data.

17. A computer-implemented method for tracking data associated with an event across a plurality of files, each file written specifically for a process that executes instructions in one module of a plurality of modules of computer instructions, comprising the steps of:

reading first data from a first file that records information associated with a first process that executes computer instructions in a first module of the plurality of modules, the first data recorded according to instructions in the first module, wherein the first data includes a non-integer based particular value that uniquely identifies a particular occurrence of an event among all occurrences of events during execution of all modules among the plurality of modules and further wherein the non-integer based particular value comprises data based on an identification for a device on which the first process executes;

reading second data from a second file of the plurality of files, the second file different from the first file, wherein the second file records information associated with a second process that executes computer instructions in a second module of the plurality of modules and is written according to the second module;

determining whether the second data includes the particular value; and if it is determined that the second data includes the particular value, then outputting in a human cognizable format a particular portion of the second data associated with the particular value to a user interested in the particular event;

wherein said step of generating the particular value further comprises including, in the particular value, data based on a time of the event.

18. The method as recited in claim 17, wherein the first process caused the second process to be executed.

19. The method as recited in claim 17, wherein the particular value further comprises data based on a time of the event.

20. The method as recited in claim 17, wherein the particular value further comprises data based on identification for a third module different from the first module.

21. The method as recited in claim 20, wherein the third module is the same as the second module.

22. The method as recited in claim 17, wherein the particular value further comprises data based on identification for a device on which executes a third process spawned by a third module different than the first module.

23. The method as recited in claim 22, wherein the third module is the same as the second module.

24. The method as recited in claim 17, wherein the plurality of modules includes instructions in a plurality of languages.

25. The method as recited in claim 17, wherein the particular event comprises at least one of reaching a certain milestone while processing data, encountering a particular user action, invoking a separate process, receiving a result from a separate process, being invoked by a separate process, returning a result to a separate process, and encountering an error or interruption in processing.

26. The method as recited in claim 17, wherein at least some information in the second data is not in the first data.

* * * * *